(12) United States Patent
Zhou et al.

(10) Patent No.: US 8,911,876 B2
(45) Date of Patent: Dec. 16, 2014

(54) METHOD FOR FORMING PATTERNS ON SUBSTRATES AND ARTICLES MANUFACTURED BY THE SAME

(75) Inventors: Quan Zhou, Shenzhen (CN); Xin-Wu Guan, Shenzhen (CN); Po-Feng Ho, New Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 248 days.

(21) Appl. No.: 13/482,579

(22) Filed: May 29, 2012

(65) Prior Publication Data

US 2013/0248057 A1    Sep. 26, 2013

(30) Foreign Application Priority Data

Mar. 23, 2012 (CN) .......................... 2012 1 0079151

(51) Int. Cl.
*B44C 1/22* (2006.01)
*C22F 1/00* (2006.01)
*C21D 6/00* (2006.01)
*B32B 15/01* (2006.01)

(52) U.S. Cl.
CPC ................. *B44C 1/227* (2013.01); *B32B 15/01* (2013.01); *C22F 1/00* (2013.01); *C21D 6/00* (2013.01); *Y10S 148/903* (2013.01)

USPC ........... 428/601; 428/614; 428/687; 148/565; 148/561; 148/903; 216/32; 216/55; 216/100

(58) Field of Classification Search
None
See application file for complete search history.

(56) References Cited

U.S. PATENT DOCUMENTS

| | | | | |
|---|---|---|---|---|
| 4,310,381 | A * | 1/1982 | DeCristofaro | 216/99 |
| 4,630,094 | A * | 12/1986 | Wiley et al. | 257/746 |
| 4,888,758 | A * | 12/1989 | Scruggs et al. | 369/101 |
| 6,030,556 | A * | 2/2000 | DePuydt et al. | 264/1.37 |
| 6,706,642 | B2 * | 3/2004 | Lee et al. | 438/745 |
| 2004/0212269 | A1 * | 10/2004 | Decristofaro et al. | 310/216 |
| 2010/0098967 | A1 * | 4/2010 | Schroers et al. | 428/600 |

FOREIGN PATENT DOCUMENTS

| | | | |
|---|---|---|---|
| JP | 61-120316 | * | 6/1986 |
| JP | 61-150337 | * | 7/1986 |
| JP | 63-33582 | * | 2/1988 |
| JP | 64-73089 | * | 3/1989 |

* cited by examiner

*Primary Examiner* — John J Zimmerman
(74) *Attorney, Agent, or Firm* — Novak Druce Connolly Bove + Quigg LLP

(57) ABSTRACT

A method for forming pattern on substrate comprises steps of: providing a metal substrate; amorphousizing the metal substrate to from an amorphous pattern layer in the metal substrate; etching the metal substrate and forming an etching portion in the surface of the metal substrate which is not covered with the amorphous pattern layer. The article manufactured by the method is also provided.

15 Claims, 3 Drawing Sheets

METHOD FOR FORMING PATTERNS ON SUBSTRATES AND ARTICLES MANUFACTURED BY THE SAME

BACKGROUND

1. Technical Field

The exemplary disclosure generally relates to a method for forming patterns on substrates and articles manufactured by the method.

2. Description of Related Art

Stainless steel has excellent wear resistance, impact resistance and high hardness. Therefore, it is widely used in many fields, such as the portable electronic devices and automotive industries. The etching processing combined with the masking process can be used to form concave-convex patterns on stainless steel. However, the masking process is complex and may contribute to environmental pollution.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary disclosure. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
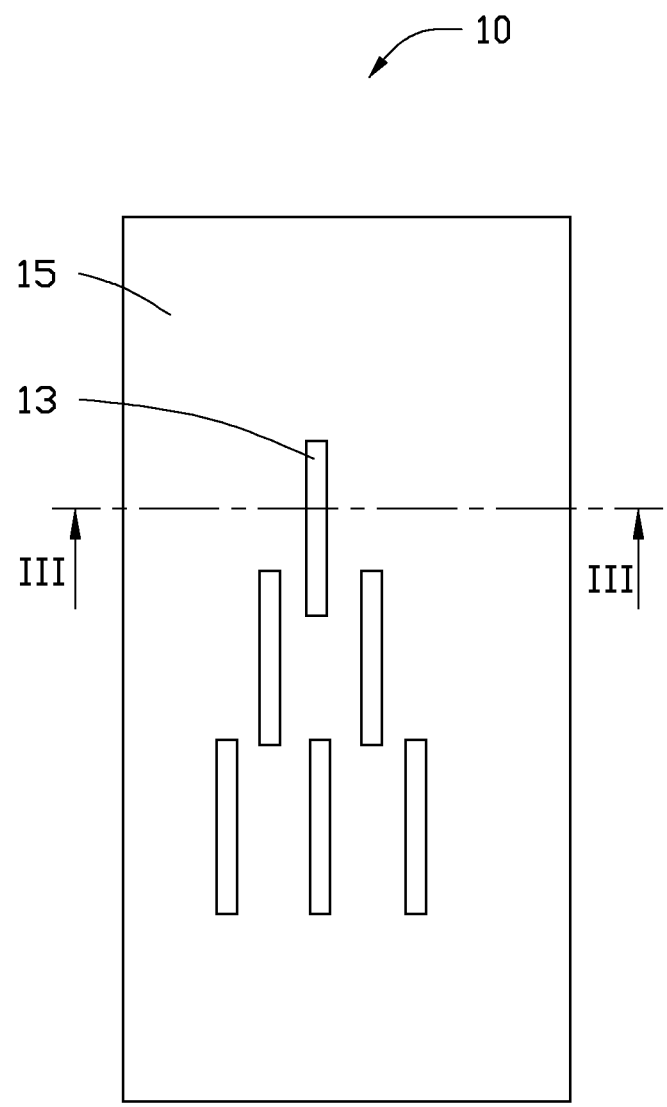
FIG. 1 is a front view of an exemplary embodiment of an article.

Referring to FIG. 1, an exemplary method for forming a pattern on a substrate may include at least the following steps:

A metal substrate 11 is provided. The metal substrate 11 may be a housing of a mobile phone, a notebook computer, a portable music player, a GPS navigator, or a digital camera. The metal substrate 11 may be made of plain carbon steel, stainless steel, chromium nickel alloy, or die steel. The metal substrate 11 is pretreated by washing with a solution (e.g., alcohol or acetone) in an ultrasonic cleaner to remove contaminants, such as grease or dirt. The metal substrate 11 is then dried.

Figure 2:
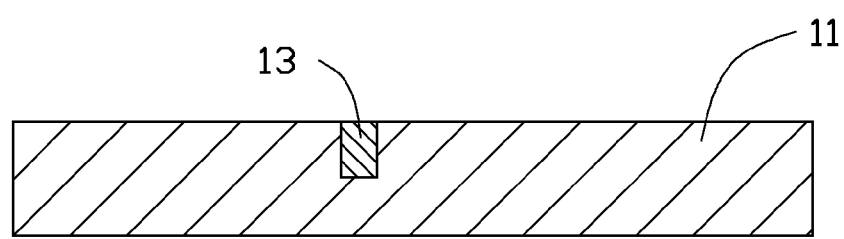
FIG. 2 is a cross-sectional view of a metal substrate coated with an amorphous pattern layer.

Referring to FIG. 2, an amorphous pattern layer 13 is formed in the metal substrate 11 by amorphousized process. First, portions of the metal substrate 11 are laser engraved under the following parameters: a power of about 4 kW to about 5 kW, a scanning rate of about 50 mm/s to about 100 mm/s, a laser power density of about $10^7$ W/cm$^2$ to about $10^8$ W/cm$^2$, and a focused diameter of a laser beam of about 10 mm to about 20 mm. The laser engraving process continues until the heated portions of the metal substrate 11 reach a temperature between the metal substrate's transformation temperature and the melting point. Next, the metal substrate 11 is rapidly cooled by liquid nitrogen or high pressure nitrogen at a cooling rate of about $10^{7\circ}$ C./s to about $10^{10\circ}$ C./s. The rapidly cooling process cause the heated portions of the metal substrate 11 to be amorphousized to form an amorphous pattern layer 13 in the substrate 11 and prevent the metal substrate 11 from being oxidized by air. The amorphous pattern layer 13 has a thickness of about 0.01 mm to about 0.05 mm. The amorphous pattern layer 13 has excellent mechanical properties, such as high hardness, wear resistance, and corrosion resistance.

During the laser engraving process, providing a laser power density of about $10^7$ W/cm$^2$ to about $10^8$ W/cm$^2$, and cooling the metal substrate 11 at a cooling rate of about $10^{7\circ}$ C./s to about $10^{10\circ}$ C./s, can allow the metal substrate 11 to form amorphous microstructure.

An etching portion 15 is formed in the metal substrate 11 by chemical etching. An etching liquid used to etching the metal substrate 11 contains ferric chloride at a concentration of about 80 g/L to about 180 g/L, and hydrochloric acid at a concentration of about 0.5 mol/L to about 5.0 mol/L. The temperature of the etching liquid is about 35° C. to about 40° C. The etching liquid is sprayed on the surface of the metal substrate 11 by a nozzle at a pressure of about 1 Pa to about 2 Pa. The chemical etching takes about 2 min to about 4 min. The height of the etching portion is less than the thickness of the amorphous pattern layer 13. Preferably, the etching liquid is reverse sprayed on the surface of the metal substrate 11 to prevent the lateral erosion of the metal substrate 11 and enhance the precision of the pattern which will form in the metal substrate 11.

Figure 3:
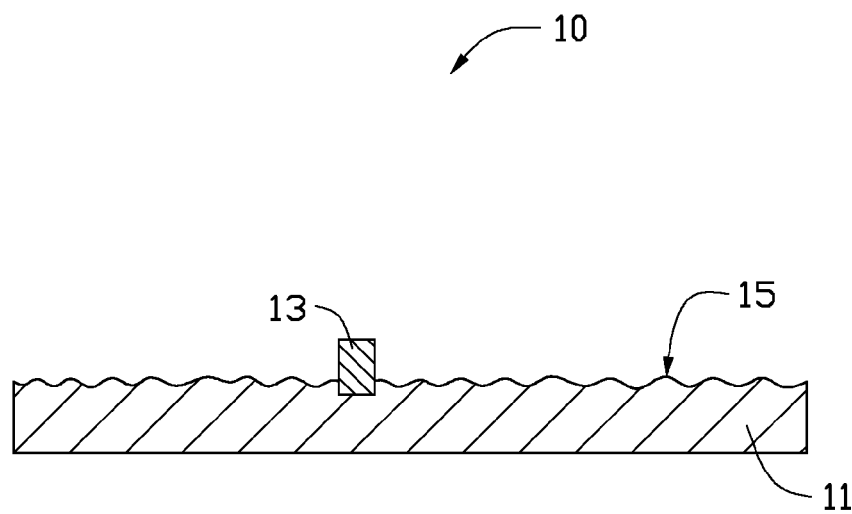
FIG. 3 is a cross-sectional view of an article of FIG. 1 taken along line III-III.

Referring to FIG. 3, during the chemical etching process, the surface of the metal substrate 11 not covered with the amorphous pattern layer 13 is etched by the etching liquid to form the etching portion 15. The roughness (Ra) of the etching portion 15 is about 0.3 μm to about 0.4 μm. The roughness (Rz) of the etching portion 15 is about 0.4 μm to about 0.6 μm.

The metal substrate 11 is washed by clean water to remove residual etching liquid on the surface of the metal substrate 11.

A article 10 manufactured by the method for forming pattern on substrate includes a metal substrate 11, an amorphous pattern layer 13, and an etching portion 15 formed in the metal substrate 11. The amorphous pattern layer 13 and etching portion 15 formed a concave-convex structure in the metal substrate 11.

The article 10 can be a housing of a mobile phone, a notebook computer, a portable music player, a GPS navigator, or a digital camera. The metal substrate 11 may be made of plain carbon steel, stainless steel, chromium nickel alloy, or die steel.

The amorphous pattern layer 13 is formed by laser engraving portion of the metal substrate 11. The amorphous pattern layer 13 has an amorphous microstructure. The amorphous pattern layer 13 has a thickness of about 0.01 mm to about 0.05 mm.

The etching portion 15 is formed by chemical etching. The roughness Ra of the etching portion 15 is about 0.3 μm to about 0.4 μm. The roughness Rz of the etching portion 15 is about 0.4 μm to about 0.6 μm.

The laser engraving combined with the chemical etching formed a three-dimensional and concave-convex pattern in the metal substrate 11. The method is simple and has almost no environmental pollution. The amorphous pattern layer 13 formed by the method has excellent abrasion resistance.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for forming pattern on substrate comprising steps of:
providing a metal substrate;
amorphousizing the metal substrate to from an amorphous pattern layer in the metal substrate;
etching the metal substrate and forming an etching portion in the surface of the metal substrate not covered with the amorphous pattern layer.

2. The method of claim 1, wherein the metal substrate is made of plain carbon steel, stainless steel, chromium nickel alloys, or die steel.

3. The method of claim 1, wherein the amorphous pattern layer is formed by: laser engraving the metal substrate until the metal substrate reaches a temperature between the metal substrate's transformation temperature and the melting point; and rapidly cooling the metal substrate to form an amorphous pattern layer in the metal substrate.

4. The method of claim 3, wherein the laser engraving process is carried out under the following parameters: a power of about 4 kW to about 5 kW, a scanning rate of about 50 mm/s to about 100 mm/s, a laser power density of about $10^7$ W/cm$^2$ to about $10^8$ W/cm$^2$, and a focused diameter of a laser beam of about 10 mm to about 20 mm.

5. The method of claim 4, wherein the metal substrate is rapidly cooled at a cooling rate of about $10^7$° C./s to about $10^{10}$° C./s.

6. The method of claim 4, wherein the metal substrate is rapidly cooled using liquid nitrogen or high pressure nitrogen.

7. The method of claim 1, wherein the etching the metal substrate step is carried out using an etching liquid, the etching liquid comprising ferric chloride at a concentration of about 80 g/L to about 180 g/L, and hydrochloric acid at a concentration of about 0.5 mol/L to about 5.0 mol/L.

8. The method of claim 7, wherein the temperature of the etching liquid is about 35° C. to about 40° C.

9. The method of claim 7, wherein the etching liquid is sprayed on the surface of the metal substrate at a pressure of about 1 Pa to about 2 Pa.

10. The method of claim 7, wherein the etching the metal substrate step takes about 2 min to about 4 min.

11. An article, comprising:
a metal substrate;
an amorphous pattern layer formed in the metal substrate; and
an etching portion formed in the metal substrate where the metal substrate is not covered with the amorphous pattern layer, the amorphous pattern layer and etching portion forming a concave-convex structure, the amorphous pattern layer having an amorphous microstructure.

12. The article as claimed in claim 11, wherein the metal substrate is made of plain carbon steel, stainless steel, chromium nickel alloys, or die steel.

13. The article as claimed in claim 11, wherein the amorphous layer has a thickness of about 0.01 mm to about 0.05 mm.

14. The article as claimed in claim 11, wherein the roughness Ra of the etching portion is about 0.3 μm to about 0.4 μm.

15. The article as claimed in claim 11, wherein the roughness Rz of the etching portion is about 0.4 μm to about 0.6 μm.

* * * * *